Figure 4:
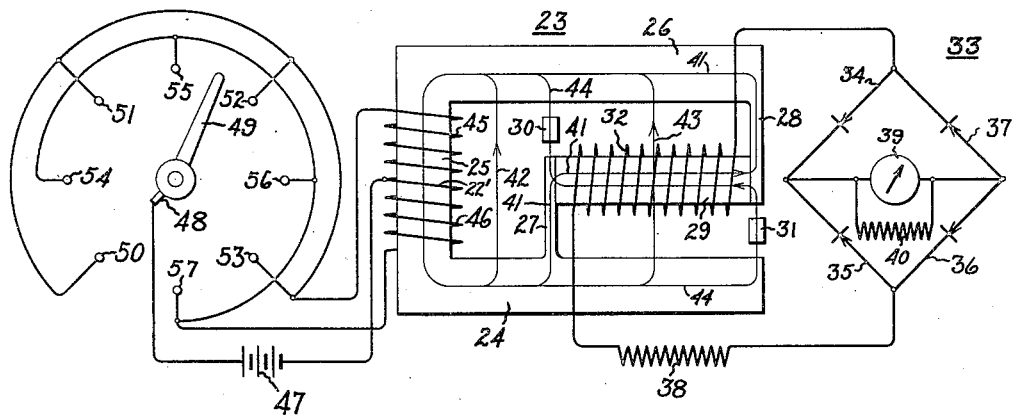

Oct. 3, 1933.  T. A. RICH  1,929,259
SPEED AND FREQUENCY INDICATOR
Filed June 30, 1930  2 Sheets-Sheet 1
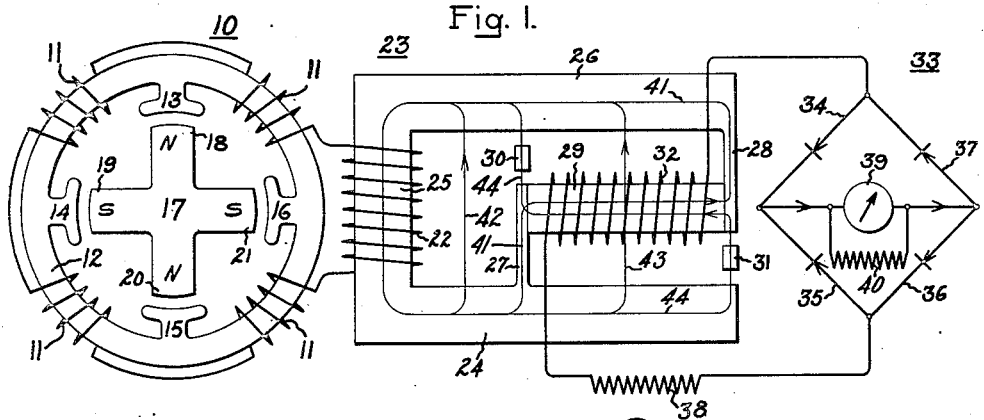
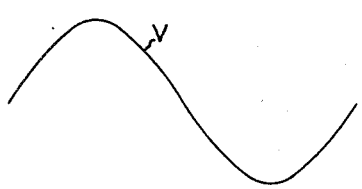
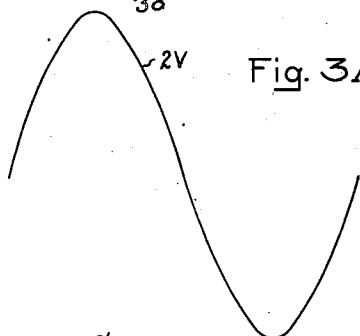
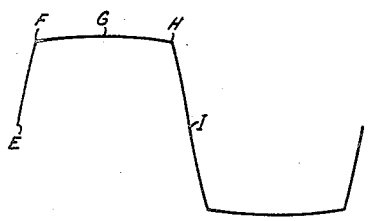
Inventor:
Theodore A. Rich,
by Charles E. Tullar
His Attorney.

Patented Oct. 3, 1933

1,929,259

UNITED STATES PATENT OFFICE 1,929,259

SPEED AND FREQUENCY INDICATOR

Theodore A. Rich, East Lynn, Mass., assignor to General Electric Company, a corporation of New York Application June 30, 1930. Serial No. 464,760

18 Claims. (Cl. 175—368)

My invention relates to a speed and frequency indicator and the object of my invention is to provide a light and efficient indicator giving highly accurate indications over a wide range of speed, voltage and temperature. My invention is especially suitable for indicating the speed of aircraft engines and will be described in connection with such use but it will be evident from the description that it is equally suitable for indicating the speed of any moving element or for indicating the frequency of alternating current systems.

During the operation of aircraft it is important that the pilot should have on his instrument panel an instrument indicating the engine speed. A mechanically operated speed indicator involves complications such as flexible shafts, etc., and hence it is desirable to have an electrically operated speed indicator. The usual electrical speed indicator consists of a small alternating current generator driven by the aircraft engine, the generator having a permanent magnet, and on the instrument panel there is a voltmeter connected to the armature of the generator, the voltmeter being calibrated to read in R. P. M. Theoretically the generator voltage should be directly proportional to the engine speed whereby the voltmeter would accurately indicate the engine speed but practically this is not so because the strength of the permanent magnet changes with age, vibration and temperature variation which is especially severe on aircraft. In addition, the variation in temperature changes the resistance of the armature and voltmeter windings, hence causing further errors, and thus the voltmeter will not accurately indicate engine speeds under various operating conditions or after an extended operating period.

I overcome the above mentioned disadvantages by employing a magneto generator supplying current to a transformer of novel construction, the arrangement being such that the voltage impressed on the indicating instrument is substantially directly proportional to the generator frequency within the range of speeds to be indicated. The voltage impressed on the indicating instrument will thus be substantially directly proportional to the generator speed and to the engine speed, and will not be affected by vibration, temperature change, or variation in strength of the generator magnet.

In the preferred embodiments of my invention, I use a simple form of rectifier for rectifying the current delivered by the generator or by the secondary winding of the transformer referred to, thereby permitting me to employ a direct current instrument to indicate the speed and thus I obtain easy reading speed indications since such an instrument has equal deflections for equal increments of voltage applied to the instrument. I will therefore describe my invention in connection with a direct current indicating instrument and a rectifier interposed between the instrument and its energizing winding but it is to be understood that my invention is not limited to the indicating means described.

My invention will be best understood from the following description when considered in connection with the accompanying drawings while the features of my invention which are believed to be novel and patentable are set forth in the appended claims.

Fig. 1 shows a preferred embodiment of my invention using an alternating current magneto generator, a transformer so constructed that its secondary winding gives an alternating voltage whose average value is substantially directly proportional to the frequency of the magneto, a rectifier to convert the alternating current into direct current and a direct current instrument energized by this direct current. Figs. 2A, 2B, 3A, and 3B represent curves useful in explaining the operation of my invention. Fig. 4 represents a modification of my invention where a direct current source is used for energizing the transformer.

In Fig. 1, 10 represents the alternating current magneto generator consisting of stationary armature windings 11 placed on the magnet frame 12 having pole pieces 13, 14, 15, and 16. The rotatable permanent magnet 17 has pole pieces 18, 19, 20, and 21 whose polarities may be as shown. The magnet 17 is rotated by the aircraft engine using any suitable driving means. The frame 12 and the pole pieces 13, 14, 15, and 16 are dimensioned so as to operate below saturation. The ends of the winding 11 are connected to the primary winding 22 of the laminated core transformer 23 whose legs 24, 25, and 26 are of sufficiently large cross-section to have a substantially uniform permeability throughout the range of speeds to be indicated, the leg 25 being substantially perpendicular to legs 24 and 26. The legs 27 and 28 project from and are substantially perpendicular to legs 24 and 26 respectively, the legs 27 and 28 being of sufficiently small cross-section to be saturated within the range of speeds to be indicated. The leg 29 may be made as a continuous projection of the legs 27 and 28 with the leg 29 substantially perpendicular to the leg 25. It is however usually preferable to make a separate leg 29 as I have illustrated and assemble the leg 29 substantially perpendicular to the leg 25 with the laminations of 29 interleaving the laminations of 27 and 28, thus permitting slight tilting of 29 from the perpendicular position. With either construction the leg 29 is of sufficient cross-section so as not to be saturated within the range of speeds to be indicated. The pieces 30 and 31, when used, are of magnetic material and may be secured in the positions shown by non-magnetic material. Surrounding the leg 29 is the secondary winding 32 which is connected to a copper oxide full wave rectifier 33 having sections 34, 35, 36, and 37. A high resistance 38 having a zero or slightly negative temperature coefficient is connected between 32 and 33. The milliammeter 39 is connected so as to be energized by the rectified current from 33, and the resistance 40 having a zero or slightly negative temperature coefficient is connected across 39.

I will first describe the operation of my invention with the leg 29 substantially perpendicular to the leg 25 and without the use of the pieces 30 and 31. Assume the generator 10 to be direct driven by the engine whose speed range to be indicated is for example from 500 to 1500 R. P. M. When 10 rotates at 500 R. P. M. the instantaneous voltage induced in the winding 11 may for example be represented by the curve V in Fig. 2A. The alternating current flowing in 22 causes an alternating magnetic flux in the transformer 23. The legs 27 and 28 will be saturated because they are dimensioned to be saturated during the entire range of speeds to be indicated. The transformer 23 has two flux paths which compared to each other are of relatively low and high magnetic reluctance. The relatively low magnetic reluctance path consists of legs 25, 24, 27, 29, 28, and 26, and this path may be represented by the line 41. The relatively high magnetic reluctance path is shown by the lines 42 and 43. The direction of the fluxes in paths 41, 42 and 43 during one half cycle is shown by the arrows on these lines. The maximum value of the flux in path 41 is determined by the saturation of the legs 27 and 28 and therefore the remaining flux of the transformer is forced through the relatively high magnetic reluctance path such as represented for example by the lines 42 and 43. The fluxes in the paths 42 and 43 are non-inductively related to the winding 32, thus not inducing any voltage in the winding 32. The flux in the path 41 is inductively related to the winding 32, thus inducing a voltage in the winding 32. When 10 rotates at 500 R. P. M. the instantaneous flux in the path 41 may be for example represented by the curve shown in Fig. 2B where E represents zero flux, from E to F the flux increases to its substantially saturated value with increasing magnetomotive force, from F to G the flux increases very slightly because although the legs 27 and 28 are substantially saturated the flux threading 27 and 28 increases very slightly with increasing magnetomotive force, from G to H the flux decreases very slightly with decreasing magnetomotive force, and from H to I the flux decreases to zero. The other half of the cycle is similar but in reverse direction. An alternating voltage is induced in winding 32, Fig. 1, and during one half of the cycle the current from 32 flows through 34, 39, and 36, as shown by the arrows thereon whereas during the other half of the cycle the current flows through 35, 39, and 37, as shown by the arrows thereon, thus giving full wave rectification, and as the indicating element of 39 is unable to follow the fluctuations in current values it assumes a position corresponding to the average current flowing in 39 and I assume that position is marked 500 R. P. M.

If the engine speed is increased to 1000 R. P. M. the frequency and magnitude of the voltage induced in the winding 11 will be double their respective values at 500 R. P. M. and the impedance of the windings 11 and 22 at 1000 R. P. M. will be substantially double their respective values at 500 R. P. M. because their resistances are small compared to their reactances. The current flowing in winding 22 and the flux in path 41 at 1000 R. P. M. will have nearly the same values they respectively had at 500 R. P. M. If there are no changes in the constants of the magnetic circuit the maximum value of the flux in path 41 will be substantially constant and independent of the speed as long as the resistances of windings 11 and 22 are small compared to their reactances. The average current flowing in the instrument 39 and hence the indication of 39 will be substantially directly proportional to the average voltage induced in the winding 32. The average voltage induced in winding 32 is equal to $4fN\phi^{max}10^{-8}$, where $f$ represents the frequency of the flux inductively related to winding 32, N represents the number of turns in winding 32, and $\phi^{max}$ represents the maximum value of the flux inductively related to winding 32. The instrument 39 would tend to give uniform indications on its scale even if the legs 27 and 28 were not saturated, but these legs are saturated so that comparatively large changes in the magnetomotive force in the transformer 23 will make very slight changes in $\phi^{max}$ and therefore the indications of 39 are substantially directly proportional to the frequency of 10 over a larger range of speeds than if these legs were unsaturated. It is evident that the uniform indications on the scale of the instrument 39 are a valuable feature.

Under the above described conditions the saturation of legs 27 and 28 resulted in a great convenience but under other conditions the saturation of these legs is a necessity. Thus, if by any means while generator 10 is rotating at 500 R. P. M. the voltage induced in winding 11 is increased from the value represented by V in Fig. 2A to the value represented by 2V in Fig. 3A, the magnetomotive force in the transformer 23 will be substantially doubled and the flux in path 41 will be changed from the value represented by the curve in Fig. 2B to the value represented by the curve in Fig. 3B. It can be seen that the maximum value of the flux represented by G' in Fig. 3B is only very slightly larger than the maximum value of the flux represented by G in Fig. 2B. I am able to obtain this very slight difference between G' and G by making the laminations of transformer 23 out of a material having a very high permeability and a sharp knee near the saturation point on its magnetization curve, such material being for example Permalloy which is described in United States Patent No. 1,586,883. It follows that the average voltage induced in 32 is substantially directly proportional to the value of $f$ and therefore at 1000 R. P. M. the average voltage induced in 32 is double that at 500 R. P. M. The average current in 39 and hence its indication at 1000 R. P. M. will therefore be double that at 500 R. P. M. The value of $\phi^{max}$ is substantially constant during the entire range of speeds to be indicated and the indications of 39 are substantially directly proportional to the value of $f$ and thus to the speed of 10. If the scale of 39 is marked in R. P. M. it will correctly indicate the speed of the aircraft engine.

To reproduce the effect of a decreased strength of magnet 17 caused by age, vibration, etc., I conducted tests where I reduce the voltage applied to winding 22 to a considerably lower value than the voltage of 10 corresponding to its speed and the indicating error of 39 was less than 1% which is sufficiently accurate for practically all purposes.

Aircraft are subjected to great variations in temperatures, and as the secondary winding 32 and the indicating armature of 39 are usually made of copper their resistances will decrease with decreased temperature and vice versa, whereas the copper oxide rectifier 33 increases in resistance with decreased temperature and vice versa. The change in resistance of 33 is greater than the combined change in resistance of 32 and 39 and if not compensated for, 39 would read low with decreasing temperature and high with increasing temperatures. To prevent these errors I provide a resistance 38 having a zero or very slight negative temperature coefficient and whose resistance is many times the combined resistance of 32, 33 and 39, whereby with temperature variations the per cent change in resistance of the entire circuit will be very small and the current in 39 will be very nearly directly proportional to the voltage of 32. In addition, I connect across 39 a resistance 40 having a zero or slightly negative temperature coefficient so that with decreasing temperature a larger portion of the rectifier current will flow through 39 and with increasing temperature a smaller portion of the rectifier current will flow through 39. If suitable values of 38 and 40 are selected the instrument 39 will give nearly perfect indications over a wide range of temperature and tests I have conducted with temperature variations from −40° C. to +40° C. showed less than 1% indicating error which is sufficiently accurate for all practical purposes. The variations in resistance of windings 11 and 22 with temperature variations have substantially no effect on the indications of 39 because the legs 27 and 28 are saturated.

I have described my invention in connection with speed indications but it is evident that 39 may be used to indicate the frequency of 10 or the primaly winding 22 may be connected to an alternating current system whose frequency will be indicated by 39. I have conducted tests and I have found that I obtained an indicating device having high accuracy, light weight and good efficiency by making the permanent magnet 17 of cobalt steel, thus reducing the weight for a given amount of flux and by making the laminations of the transformer 23 of Permalloy.

Compensation for the slight indicating errors of 39 due to the induced voltage of 32 not being strictly independent of the voltage impressed on the winding 22 may be accomplished by either of the two following methods.

1. Tilting the leg 29 so that 32 becomes inductively related to the flux threading the path of relatively high magnetic reluctance as shown for example by the line 43 so as to induce a voltage in 32 opposing the voltage induced therein by the flux threading the path of relatively low magnetic reluctance as shown for example by the line 41. If the voltage impressed on the winding 22 increases beyond the value it had when instrument 39 was calibrated, the magnetomotive force in the legs 24 and 26 increases slightly, thus increasing the flux in the path 43 and increasing the bucking voltage induced in 32. With proper tilt of 29 this bucking voltage will balance the induced voltage in winding 32 above the value it had when the instrument 39 was calibrated. It follows that the voltage induced in winding 32 and hence the indications of 39 will be strictly directly proportional to the speed of 10.

2. Securing the pieces 30 and 31 in the position shown in Fig. 1 by any nonmagnetic material. As the leg 29 is not saturated there will be a flux path consisting of legs 25, 24, piece 31, leg 29, piece 30, leg 26 and back to leg 25. The flux in this path is represented by the line 44 and its direction during the half cycle considered is represented by the arrow on 44. The flux in the path 44 thus opposes the flux in the path 41 and they also oppose during the other half cycle. If the voltage impressed on the winding 22 increases beyond the value it had when the instrument 39 was calibrated the magnetomotive force in the legs 24 and 26 increases slightly, thus causing a slight increase in the fluxes of the paths 41 and 44, and by choosing 30 and 31 of proper length and cross section the effective flux threading winding 29 is strictly constant at all speeds of 10, thus causing the voltage of 32 and the indications of 39 to be strictly directly proportional to the speed of 10.

In practically all cases complete compensation is secured by tilting the leg 29 and seldom if ever will the pieces 30 and 31 be used for compensation.

Fig. 4 represents a modification of my invention using direct current to energize the transformer, similar parts to those in Fig. 1 being represented by the same numbers. The dissimilar parts are the primary winding 22' which is divided into the sections 45 and 46 having substantially the same number of turns, these sections being wound on the leg 25. The junction point of the sections 45 and 46 is connected to one terminal of the direct current source such as the battery 47 whose other terminal is connected to the brush 48 rubbing on the rotatable contactor 49 driven by the moving element whose speed is to be indicated by 39. Stationary contacts 50, 51, 52 and 53 are connected to the end of winding 45 whereas stationary contacts 54, 55, 56, and 57 are connected to the end of winding 46. As 49 rotates it makes contact with consecutive contacts causing successive excitation of the windings 45 and 46 and producing an alternating magnetic flux in the transformer 23 which operates as descried in connection with Fig. 1, and hence in Fig. 4 the instrument 39 will give indications which are substantially directly proportional to the speed of 49. Compensation for variation in voltage of the battery 47 may be secured by tilting the leg 29 or by the use of the pieces 30 and 31. In many cases satisfactory indicating accuracy of 39 may be obtained by omitting one primary winding section and its stationary contacts, thus operating the transformer with a unidirectional pulsating magnetic flux.

I have illustrated certain constructions of the transformer and a particular type of indicating circuit but obviously many modifications will readily suggest themselves to those skilled in the art without departing from the principles of my invention. I therefore wish it understood that the embodiments represented are merely illustrative of my invention and that all modifications coming within the true spirit and scope of my invention are intended to be included within the scope of the appended claims.

What I claim as new and desire to secure by Letters Patent of the United States is:

1. Indicating apparatus comprising a magnetic core, a coil surrounding a portion of said core, an instrument energized by said coil, and means for producing a pulsating flux in said magnetic core, said magnetic core having restricted portions intermediate said coil and flux producing means whereby said restricted portions become saturated by said pulsating flux during the indicating range, and said portion of the core surrounded by said coil being positioned relatively to said flux producing means so that any leakage flux passing through said coil induces substantially no voltage therein.

2. Indicating apparatus comprising a direct current instrument, a rectifier energizing said instrument, a coil energizing said rectifier, a magnetic core on a portion of which said coil is assembled, and means for producing a pulsating flux in said magnetic core, said magnetic core having restricted portions intermediate said coil and flux producing means whereby said restricted portions become saturated by said flux producing means during the indicating range, and said portion of the core on which said coil is assembled being positioned relatively to said flux producing means so that any leakage flux passing through said coil induces substantially no voltage therein.

3. An electro-responsive device comprising a magnetic core, a winding surrounding a portion of said core, means for producing a pulsating flux in said core, means to cause said winding to be inductively threaded by a pulsating magnetic flux whose maximum value is substantially constant within a predetermined operating range of said device, said portion of the core surrounded by said winding being positioned relatively to said flux producing means so that any leakage flux passing through said coil induces substantially no voltage therein, a rectifying device energized by said winding, and a direct current instrument operated by the current flowing in said rectifying device.

4. An electro-responsive device comprising a magnetic core having a path of relatively high magnetic reluctance and a path of relatively low magnetic reluctance, means to cause both of said paths to be threaded by a pulsating magnetic flux, means to cause the maximum value of the flux threading the relatively low magnetic reluctance path to be substantially constant within a predetermined operating range of said device, a winding inductively related to the flux threading the relatively low magnetic reluctance path and substantially noninductively related to the flux threading the relatively high magnetic reluctance path, and an electrical instrument energized by said winding.

5. An indicating device comprising a core of magnetic material having a high permeability and a sharp knee near the saturation point on its magnetization curve, primary and secondary windings surrounding different portions of said core, means to energize said primary winding with alternating current causing an alternating magnetic flux to thread the secondary winding, means to cause the maximum value of the flux inductively threading the secondary winding to be substantially constant within the indicating range, said different portions of the core being positioned relatively to each other so that the leakage flux passing through said secondary winding induces substantially no voltage therein, and an electrical instrument energized by the secondary winding.

6. An indicating device comprising a core of magnetic material having a high permeability and a sharp knee near the saturation point on its magnetization curve, primary and secondary windings surrounding different portions of said core, means to energize said primary winding with alternating current causing an alternating magnetic flux to thread the secondary winding, means to cause the maximum value of the flux inductively threading the secondary winding to be substantially constant within the indicating range, said different portions of the core being positioned relatively to each other so that the leakage flux passing through said secondary winding induces substantially no voltage therein, a rectifying device energized by the secondary winding and a direct current instrument calibrated in speed units operated by the current flowing in said rectifying device.

7. An indicating device comprising a core of magnetic material having a high permeability and a sharp knee near the saturation point on its magnetization curve and having a path of relatively high magnetic reluctance and a path of relatively low magnetic reluctance, a primary winding surrounding said core, means to energize said primary winding with alternating current causing an alternating magnetic flux to thread both of said paths, means to cause the maximum value of the flux threading the relatively low magnetic reluctance path to be substantially constant within the indicating range, a secondary winding surrounding said core inductively related to the flux threading the relatively low magnetic reluctance path and substantially noninductively related to the flux threading the relatively high magnetic reluctance path, and an electrical instrument energized by the secondary winding.

8. An electro-responsive device comprising a magnetic core having a path of relatively high magnetic reluctance and a path of relatively low magnetic reluctance, a primary winding surrounding said core, means to energize said primary winding with alternating current causing an alternating magnetic flux to thread both of said paths, means to cause the maximum value of the flux threading the relatively low magnetic reluctance path to be substantially constant within a predetermined operating range of said device, a secondary winding surrounding said core inductively related to the flux threading the relatively low magnetic reluctance path and substantially noninductively related to the flux threading the relatively high magnetic reluctance path, an electrical instrument energized by the secondary winding, and means to change the relative positions of the secondary winding and the flux threading the relatively high magnetic reluctance path so as to cause the secondary winding to be inductively related to the last mentioned flux.

9. An electro-responsive device comprising a magnetic core having a path of relatively high magnetic reluctance and a path of relatively low magnetic reluctance, a primary winding surrounding said core, means to energize said primary winding with alternating current causing an alternating magnetic flux to thread both of said paths, means to cause the maximum value of the flux threading the relatively low magnetic reluctance path to be substantially constant within a predetermined operating range of said device, a secondary winding surrounding said core inductively related to the flux threading the relatively low magnetic reluctance path and substantially noninductively related to the flux threading the relatively high magnetic reluctance path, an electrical instrument energized by the secondary winding, and means to cause a flux to inductively thread the secondary winding in opposition to the flux threading the said secondary winding and relatively low magnetic reluctance path.

10. An electro-responsive device comprising a magnetic core having a pair of legs joined by a third leg, a pair of projecting legs of which each leg projects from one of said pair of legs towards but not reaching the other of said pair of legs, each leg of said pair of projecting legs being at different distances from said third leg, a connecting leg joining the pair of projecting legs, the said connecting leg being substantially perpendicular to the third leg, a winding on said third leg, a winding on said connecting leg, means to energize one of said windings to cause a pulsating magnetic flux to thread all of said legs, and an electrical instrument energized by the other winding.

11. An electro-responsive device comprising a magnetic core having a pair of legs joined by a third leg, a pair of projecting legs of which each leg projects from one of said pair of legs toward but not reaching the other of said pair of legs, each leg of said pair of projecting legs being at different distances from said third leg, a connecting leg joining the pair of projecting legs, the said connecting leg being substantially perpendicular to the third leg, a winding on said third leg, a winding on said connecting leg, means to energize one of said windings to cause a pulsating magentic flux to thread all of said legs, an electrical instrument energized by the other winding, and adjustable strips of magnetic material between each of said pair of legs and the adjacent end of a projecting leg.

12. An electro-responsive device comprising a magnetic core having a pair of legs joined by a third leg, a pair of projecting legs of which each leg projects from one of said pair of legs toward but not reaching the other of said pair of legs, each leg of said pair of projecting legs being at different distances from said third leg, a connecting leg joining the pair of projecting legs, the said connecting leg being substantially perpendicular to the third leg, a winding on said third leg, a winding on said connecting leg, means to energize one of said windings to cause a pulsating magnetic flux to thread all of said legs, at least one of said legs being dimensioned to become saturated during a predetermined operating range of said device, and an electrical instrument energized by the other winding.

13. An indicating device comprising a magnetic core having a pair of legs joined by a third leg, a pair of projecting legs of which each leg projects from one of said pair of legs toward but not reaching the other of said pair of legs, each leg of said pair of projecting legs being at different distances from said third leg, a connecting leg joining the pair of projecting legs, the said connecting leg being substantially perpendicular to the third leg, a winding on said third leg, a winding on said connecting leg, means to energize one of said windings to cause a pulsating magnetic flux to thread all of said legs, the pair of projecting legs being dimensioned to become saturated during the entire indicating range whereas the remaining legs are dimensioned not to become saturated during said range, and an electrical instrument energized by the other winding.

14. Apparatus for indicating speed comprising an alternating current generator, a direct current instrument energized thereby and calibrated in speed units, rectifying means connected between said generator and instrument, and means for causing the alternating current voltage supplied to said rectifier at a given frequency to be independent of voltage variations of the generator above a predetermined generator voltage.

15. An electro-responsive device comprising an alternating current generator, a rectifier, a magnetic core having two core sections substantially perpendicular to each other with a restricted core section intermediate said two core sections, primary and secondary windings respectively surrounding said two core sections and respectively connected to said generator and to said rectifier, said restricted core section being dimensioned to become saturated at a predetermined current flow in said primary winding, and an electrical instrument connected to be operated by the current flowing in said rectifier.

16. An electro-responsive device comprising a magnetic core having two non-abutting core sections positioned with their longitudinal axes substantially perpendicular to each other at the center of one of said axes and at least one restricted core section intermediate said two core sections, primary and secondary windings respectively surrounding said two core sections, said restricted core section being dimensioned to become saturated during a predetermined operating range of said device whereas the remaining sections of said core are dimensioned not to become saturated during said range, a rectifier connected to the secondary winding, and an electrical instrument connected so as to be energized by the current flowing in said rectifier.

17. Indicating apparatus comprising a magnetic core, flux producing means for causing said core to be threaded by a useful variable frequency alternating magnetic flux having a substantially constant predetermined maximum value during the indicating range, said core being so positioned that it is also threaded by leakage alternating magnetic flux from said flux producing means, a coil so positioned around said core that the above mentioned useful magnetic flux threading the latter induces an alternating voltage in the coil, said core being so positioned relatively to said flux producing means that the leakage magnetic flux threading the core induces substantially no voltage in said coil, and an electrical instrument energized by the voltage induced in said coil.

18. Apparatus for indicating the speed of a rotating body, comprising a magnetic core, flux producing means for causing said core to be threaded by a useful alternating magnetic flux whose frequency is directly proportional to the speed of said rotating body and whose maximum value is substantially constant during the speed range to be indicated, said core being so positioned that it is also threaded by leakage alternating magnetic flux from said flux producing means, a coil so positioned around said core that the above mentioned useful magnetic flux threading the latter induces an alternating voltage in the coil, said core being so positioned relatively to said flux producing means that the leakage magnetic flux threading the core induces substantially no voltage in said coil, an electrical indicating instrument having a scale calibrated in speed units, and connecting means between said coil and said instrument for impressing on the latter a voltage whose magnitude is responsive to the voltage induced in said coil.

THEODORE A. RICH.